July 5, 1932. H. N. MARSH 1,866,049
LOAD BALANCING CRANK
Filed May 7. 1928
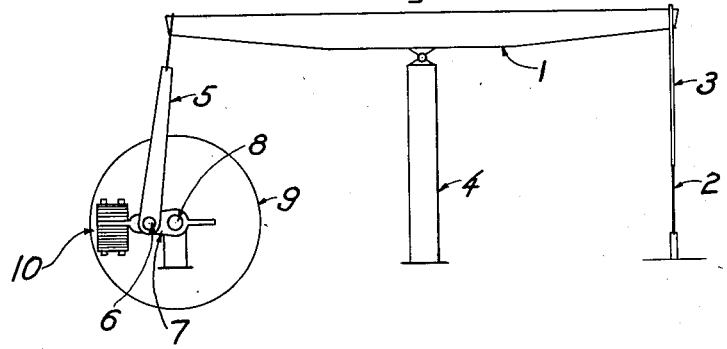
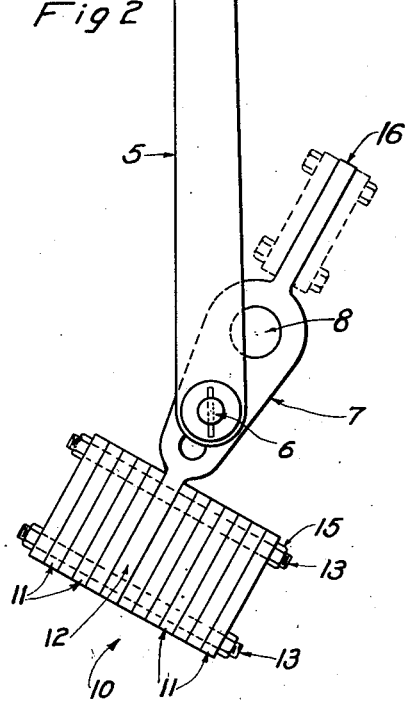
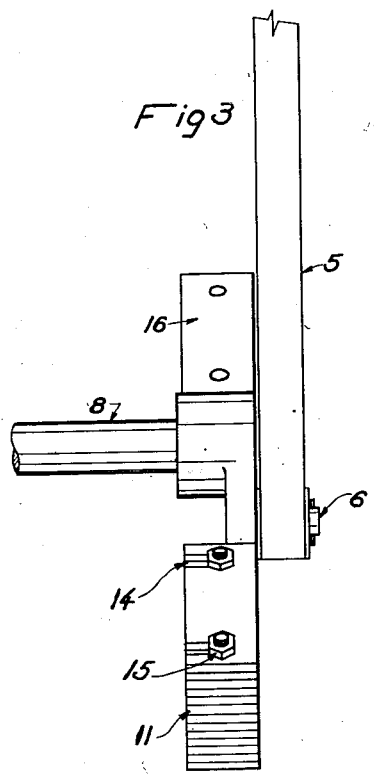
HALLAN N. MARSH
INVENTOR
BY Paul W. Pritzman
ATTORNEY Patented July 5, 1932

1,866,049

UNITED STATES PATENT OFFICE

HALLAN N. MARSH, OF LOS ANGELES, CALIFORNIA

LOAD BALANCING CRANK

Application filed May 7, 1928. Serial No. 275,801.

My invention relates to the art of pumping deep wells with especial reference to the crank used in oil well pumping practice.

The objects of my invention are:
1. To provide a crank in which the balancing effect of the crank on the load is increased by weights applied to the crank.
2. To provide a crank of such character from which the balancing weights are readily removable.
3. To provide a crank in which the angle of balance can be varied.
4. To provide a crank with means for balancing the crank alone in the absence of load thereon.
5. To provide a crank which is economical to build.

I attain these objects by the mechanism illustrated in the accompanying drawing in which:

Fig. 1 is an elevation of a usual oil well pumping arrangement showing the walking beam and my improved crank.

Fig. 2 is an elevation showing my improved crank in detail.

Fig. 3 is a side elevation of Fig. 2.

Oil wells are usually pumped by a reciprocating pump located deep in the well and actuated by a string of rods extending to the surface. These rods are reciprocated by a walking beam and crank arrangement shown in Fig. 1. Referring to this figure, 1 indicates the walking beam; 2 is the top joint of the pump rods; 3 is a pump adjuster which joints the rods to the walking beam, and 4 is the Samson post supporting the walking beam. The usual pitman 5 links the walking beam to the writs pin 6 on my improved crank 7. A band wheel shaft 8 carries the crank on one extremity, and intermediate its ends is secured the band wheel 9, driven by belt or other preferred means. This walking beam arrangement forms no part of my present invention, being very well known to this art. My invention centers about the crank alone.

The primary object of my invention is to balance the weight of the pump rods plus half the weight of the fluid column. I accomplish this by securing on the crank a suitable weight 10. Because the rods hang on one end of the beam and the pitman reacts on the opposite end, the weight of the crank itself balances a small portion of the load, and the weight 10 which balances the remainder of the load must be secured on the same side of the center of crank rotation as is the pitman.

The weight 10 is made up of slabs 11, each slab weighing preferably not over seventy five pounds, which will enable one man to handle them alone. These slabs are bolted to the extension 12 of the crank, the bolts 13 passing through slots 14 in each slab, making possible their removal by merely loosening the nuts 15. Sufficient of these slabs are secured to the crank to produce the desired balance, the small weight of each slab making possible a relatively close balance.

Due to the great length of the pump rods, their consequent elasticity changes the position of the crank when it picks up the load; that is to say, the load on the beam usually lags behind its normal point in the crank revolution. It is desirable to have the balance weight opposite the load without regard to the position of the crank. This angle of lag is small but withal important. By assembling the slabs on bolts which are in the plane of crank rotation, the center of gravity of the balance weight can be shifted relative to the crank revolution while remaining in the same plane. This is accomplished by merely adding more slabs on one side than on the other. In this manner the balancing effect of the weight 10 is brought opposite the load, which often results in a material saving of power and improved smoothness of operation.

When pulling rods or performing other operations requiring a hoist the same engine is customarily used as is used for pumping. The band wheel then forms part of the intermediate drive between engine and hoist. The pitman is disconnected from the crank during these operations and the balance weight 10 must be removed. The slots in the slabs provided in my improved counterbalance, their small individual weight and the unobstructed access to the crank due to my novel construction combine to greatly reduce the labor of removing the balance weight. In other types of rotating balances, the balance weights are secured either to the band wheel or to the band wheel shaft, located inside the belt house and in a very awkward position in which to work on them.

During such rod pulling operation the crank rotates much faster than when pumping, and sets up severe racking strains due to unbalanced centrifugal force. To obviate these strains I provide an extension 16 opposite the crank throw and, when making ready to pull or replace rods, secure to this extension enough of the slabs 11 to balance the weight of the crank. Thus balanced, the crank may be rotated at any required speed without damage.

A further and important advantage inherent in my invention is found in the fact that the load is balanced at the point at which it is applied in the reciprocating mechanism—at the crank pin. Thus the high stresses due to reversal of direction are transmitted through only one rotating part, the crank pin, instead of through pin, crank, crank shaft and usually the band wheel also, as in mechanism heretofore used. The shaft and band wheel being necessarily the weakest links in the chain, the life of the apparatus is thus materially increased.

The principle of the rotating counterbalance is well known and I do not broadly claim such a device. My invention lies in a specific application of counterbalance in the manner disclosed, and is limited solely by the following claim.

I claim as my invention:

A load-balancing crank for oil well pumping, comprising: a crank, a first extension of said crank in the direction of its throw; a second extension of said crank in the direction opposite its throw; a plurality of weights, and means for securing said weights to said second extension and for securing said weights to said first extension in variable number on either side thereof in the plane of its revolution.

In witness that I claim the foregoing I have hereunto subscribed my name this 30th day of April, 1928.

HALLAN N. MARSH.